United States Patent
Kuo et al.

(10) Patent No.: US 8,849,341 B2
(45) Date of Patent: Sep. 30, 2014

(54) PORTABLE ELECTRICAL DEVICE

(75) Inventors: Chao-Hung Kuo, Keelung (TW); Hui Lin, Taoyuan County (TW); Po-Jen Chen, New Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 140 days.

(21) Appl. No.: 13/593,946

(22) Filed: Aug. 24, 2012

(65) Prior Publication Data

US 2013/0344824 A1 Dec. 26, 2013

(30) Foreign Application Priority Data

Jun. 25, 2012 (TW) .............................. 101122675 A

(51) Int. Cl.
*H04B 7/00* (2006.01)

(52) U.S. Cl.
USPC ........................................................ 455/523

(58) Field of Classification Search
CPC ............... H04B 2203/5404; H04B 2203/5429; H04B 2203/5462
USPC .............. 455/90.2, 90.3, 559, 73, 114.2, 271, 455/523; 333/12
See application file for complete search history.

(56) References Cited

U.S. PATENT DOCUMENTS 6,757,523 B2 * 6/2004 Fry ................................. 455/78

* cited by examiner

*Primary Examiner* — Eugene Yun
(74) *Attorney, Agent, or Firm* — Rabin & Berdo, P.C.

(57) ABSTRACT

A portable electrical device including an antenna radiation body, a wireless communication module and a cable is provided. The antenna radiation body transceives a first radio frequency (RF) signal belonging to a first frequency band. The wireless communication module processes the first RF signal. The cable connects the antenna radiation body with the wireless communication module to transmit the first RF signal. The cable has multiple grounding points. The distances between the neighboring grounding points are less than a quarter wavelength of a signal corresponding to the first frequency band.

10 Claims, 1 Drawing Sheet

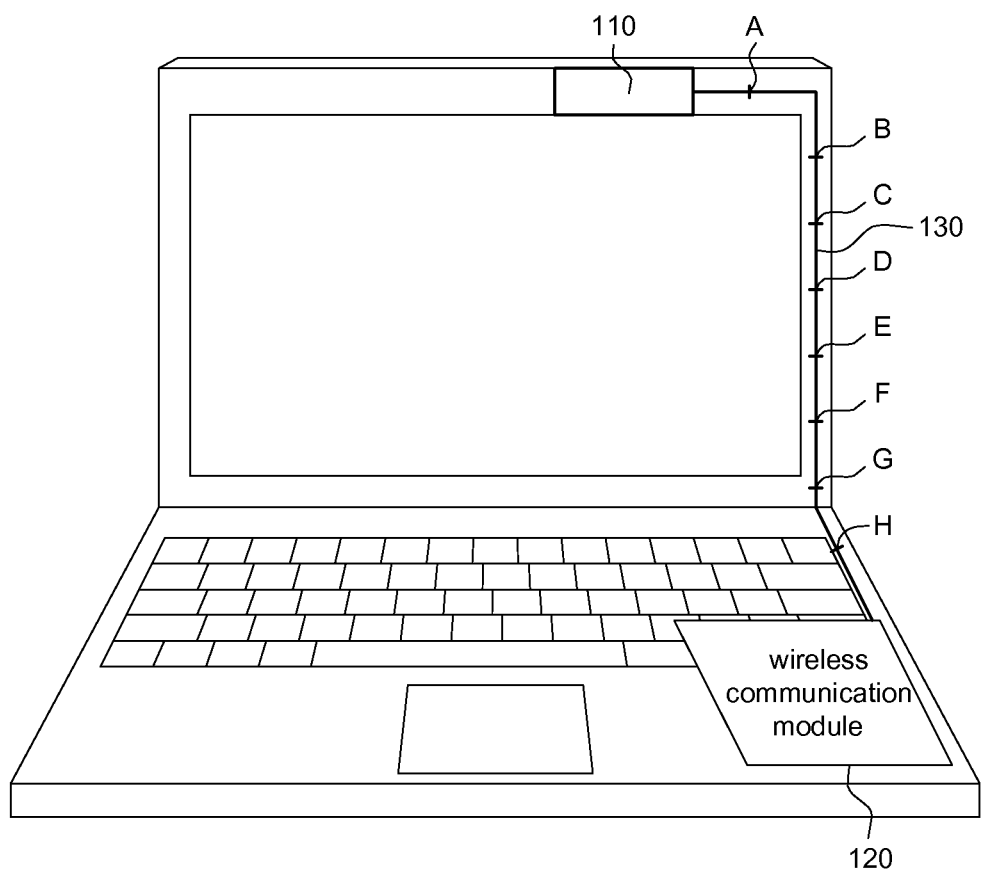

PORTABLE ELECTRICAL DEVICE

This application claims the benefit of Taiwan application Serial No. 101122675, filed Jun. 25, 2012, the subject matter of which is incorporated herein by reference.

BACKGROUND OF THE INVENTION

1. Field of the Invention

The disclosure relates in general to a portable electrical device.

2. Description of the Related Art

Nowadays, both notebook computer and tablet PC are equipped with a wireless communication module such as WiFi/BT/3G/WiMAX/LTE to satisfy the requirements in mobile communication. However, high frequency electromagnetic noises may occur to multiple electronic elements disposed in an electronic device. Also, poor circuit layout or element configuration would also make the problem of high frequency radiation even worse. The electromagnetic noises, when becoming too large, will be coupled to the cable of an antenna via the space. The electromagnetic noises generate a high frequency voltage to the metal weaved mesh surrounding the cable. On one hand, the conductor inside the antenna will generate an induced voltage stacked on the frequency band of communication signals, further increasing the error rate of the wireless communication system. On the other hand, a voltage difference occurs between the high frequency voltage and the ground potential of the wireless communication system, such that a radiation mechanism is equivalently formed, and the high frequency noises are amplified and absorbed by the antenna radiation body. Consequently, the error rate is increased and the total isotropic sensitivity (TIS) deteriorates.

SUMMARY OF THE INVENTION

The disclosure is directed to a portable electrical device effectively reducing the noises generated when a system is coupled to an antenna.

According to an embodiment of the present disclosure, a portable electrical device including an antenna radiation body, a portable electrical device including an antenna radiation body, a wireless communication module and a cable is provided. The antenna radiation body transceives a first radio frequency (RF) signal belonging to a first frequency band. The wireless communication module processes the first RF signal. The cable connects the antenna radiation body with the wireless communication module to transmit the first RF signal. The cable has multiple grounding points. The distances between the neighboring grounding points are less than a quarter wavelength of a signal corresponding to the first frequency band.

The above and other aspects of the disclosure will become better understood with regard to the following detailed description of the preferred but non-limiting embodiment(s). The following description is made with reference to the accompanying drawings.

BRIEF DESCRIPTION OF THE DRAWINGS

FIG. 1 shows a portable electrical device according to an embodiment of the disclosure.

DETAILED DESCRIPTION OF THE INVENTION

The disclosure provides a portable electrical device, which effectively reduces the noises generated when a system is coupled to an antenna by using multiple grounding points on the cable.

Referring to FIG. 1, a portable electrical device according to an embodiment of the disclosure is shown. The portable electrical device 100 includes an antenna radiation body 110, a wireless communication module 120 and a cable 130. In the following disclosure, the antenna radiation body 110 and the cable 130 transceive a radio frequency (RF) signal (such as a 3G signal) conforming to a wireless communication protocol, but the disclosure is not limited thereto.

The antenna radiation body 110 transceives a first RF signal belonging to a first frequency band such as a GSM-850/900 MHz frequency band. The wireless communication module 120 processes the first RF signal. The cable 130 is disposed on the peripheral of the portable electrical device 100 and connects the antenna radiation body 110 with the wireless communication module 120 such that the first RF signal is transmitted between the antenna radiation body 110 and the wireless communication module 120 via the cable 130. The cable 130 has multiple grounding points A~H. The cable 130 is entirely encapsulated by an insulation layer except for the part of the grounding points A~H disposed on the cable 130. That is, the grounding points A~H disposed on the cable 130 are not encapsulated by the insulation layer and are coupled to the ground potential accordingly.

In the present embodiment of the disclosure, the distances between the neighboring grounding points A~H are less than a quarter wavelength of a signal corresponding to the first frequency band. For example, the 900 MHz frequency band of the GSM-850/900 MHz frequency band is selected, a quarter wavelength of an upper limit 960 MHz RF signal corresponding to the 900 MHz frequency band about 7.8 cm is selected. Since the multiple grounding points spaced by an interval less than a quarter wavelength have higher probabilities to make the peaks of the noises grounded, the noises formed by the stacked sine waves of various frequencies can be effectively reduced.

Referring to Table 1, a quarter wavelength of a signal corresponding to various 3G frequency bands is illustrated.

TABLE 1

| Communication Frequency Band | TIS Frequency | Wavelength (cm) | ¼ Wavelength (cm) |
|---|---|---|---|
| GSM-850 MHz | 860 | 34.9 | 8.7 |
|  | 894 | 33.6 | 8.4 |
| EGSM-900 MHz | 925 | 32.4 | 8.1 |
|  | 960 | 31.3 | 7.8 |
| DCS-1800 MHz | 1805 | 16.6 | 4.2 |
|  | 1880 | 16 | 4 |
| PCS-1900 MHz | 1930 | 15.5 | 3.9 |
|  | 1990 | 15 | 3.8 |
| WCDMA 2100 | 2110 | 14.2 | 3.5 |
|  | 2170 | 13.8 | 3.4 |

Furthermore, the portable electrical device 100 is not only applicable in one single frequency band so as to be conformed to the users' requirements. For example, the portable electrical device 100 is applicable to the 1800/1900/2100 MHz frequency band in addition to the GSM-850/900 MHz frequency band. Thus, the antenna radiation body 110 may further be used for transceiving a second RF signal belonging to a second frequency band (that is, the 1800/1900/2100 MHz frequency band) higher than the first frequency band.

In general, high frequency noises decay faster, so the lower frequency the noises, the higher the levels. In the present embodiment, the distances between multiple grounding points A~H may select the 900 MHz frequency band of the GSM-850/900 MHz frequency band, and further select a quarter wavelength of an upper limit 960 MHz RF signal corresponding to the 900 MHz frequency band which is about 7.8 cm to resolve the problem of lower frequency band noises. Meanwhile, if the SNR is lower than a predetermined value, the distances between multiple grounding points A~H may select a quarter wavelength of an upper limit 2170 MHz RF signal corresponding to the highest frequency band 2100 MHz of the second frequency band (that is, the 1800/1900/2100 MHz frequency band) which is 3.4 cm to resolve the problem of higher frequency band noises. Taking the above factors into consideration, the cable 130 of the present embodiment has suitable number of grounding points, and the noises are effectively reduced.

According to the portable electrical device disclosed in the above embodiment of the disclosure, suitable number of grounding points is disposed on the cable connecting the antenna radiation body with the wireless communication module, such that the distances between the neighboring grounding points are less than a quarter wavelength of an RF signal corresponding to the frequency band, so that the noises of the entire system coupled to the antenna are effectively reduced, the system error rate is reduced, and the total isotropic sensitivity (TIS) is increased.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable electrical device, comprising:
    an antenna radiation body used for transceiving a first radio frequency (RF) signal belonging to a first frequency band;
    a wireless communication module used for processing the first RF signal; and
    a cable used for connecting the antenna radiation body with the wireless communication module to transmit the first RF signal;
    wherein, the cable has a plurality of grounding points including at least two adjacent grounding points, the adjacent two grounding points being spaces by an interval, and the interval being less than a quarter wavelength of a signal corresponding to the first frequency band.

2. The portable electrical device according to claim 1, wherein the cable is entirely encapsulated by an insulation layer except for the part of the grounding points on the cable.

3. The portable electrical device according to claim 1, wherein the antenna radiation body is used for transceiving a second RF signal belonging to a second frequency band higher than the first frequency band.

4. The portable electrical device according to claim 3, wherein when a signal to noise ratio (SNR) of the wireless communication module is not lower than a predetermined value, the distances between the neighboring grounding points are less than a quarter wavelength of a signal corresponding to the first frequency band.

5. The portable electrical device according to claim 3, wherein when an SNR of the wireless communication module is not lower than a predetermined value, the distances between the neighboring grounding points are less than a quarter wavelength of a signal corresponding to the second frequency band.

6. The portable electrical device according to claim 3, wherein the distances between the neighboring grounding points are less than a quarter wavelength of a signal corresponding to the second frequency band.

7. The portable electrical device according to claim 6, wherein the distances between the neighboring grounding points are less than a quarter wavelength of an upper limit RF signal corresponding to the second frequency band.

8. The portable electrical device according to claim 6, wherein the second frequency band at least comprises a lower frequency band and a higher frequency band, and the distances between the neighboring grounding points are less than a quarter wavelength of an upper limit RF signal corresponding to the higher frequency band of the second frequency band.

9. The portable electrical device according to claim 1, wherein the distances between the neighboring grounding points are less than a quarter wavelength of an upper limit RF signal corresponding to the first frequency band.

10. The portable electrical device according to claim 1, wherein the first frequency band at least comprises a lower frequency band and a higher frequency band, and the distances between the neighboring grounding points are less than a quarter wavelength of an upper limit RF signal corresponding to the higher frequency band of the first frequency band.

* * * * *